United States Patent [19]

Frutschi

[11] Patent Number: 5,388,397
[45] Date of Patent: Feb. 14, 1995

[54] METHOD FOR OPERATING A TURBOCOMPRESSOR

[75] Inventor: Hans U. Frutschi, Riniken, Switzerland

[73] Assignee: Asea Brown Boveri Ltd., Baden, Switzerland

[21] Appl. No.: 147,589

[22] Filed: Nov. 5, 1993

[30] Foreign Application Priority Data

Nov. 7, 1992 [DE] Germany ............... 4237664

[51] Int. Cl.$^6$ .................................. F02C 7/143
[52] U.S. Cl. ........................... 60/39.05; 60/39.53; 60/728
[58] Field of Search ............ 60/39.05, 39.182, 39.53, 60/39.54, 39.55, 728; 415/1, 179

[56] References Cited

U.S. PATENT DOCUMENTS 3,335,565  8/1967  Aguet .
3,731,485  5/1973  Rudolph et al. .............. 60/39.53
4,448,018  5/1984  Sayama et al. ................ 60/728
4,829,763  5/1989  Rao ............................... 60/39.53

*Primary Examiner*—Louis J. Casaregola
*Attorney, Agent, or Firm*—Burns, Doane, Swecker & Mathis

[57] ABSTRACT

The invention relates to a method for operating a turbocompressor (12) having at least two compressor stages and a cooler (14) to which water is applied as coolant, the heated cooling water having a pressure exceeding the saturation pressure, with the result that said cooling water is partially evaporated in an evaporation vessel (30) at an intermediate pressure level less than the saturation pressure. The steam thus produced evacuates by means of an ejector (34) a second evaporation vessel (32), in which a proportion of the residual water of the first vessel (30) is, in turn, evaporated and the remaining water is cooled below 100° C.

9 Claims, 2 Drawing Sheets

METHOD FOR OPERATING A TURBOCOMPRESSOR

BACKGROUND OF THE INVENTION

1. Field of the Invention

The present invention relates to a method for operating a turbocompressor. Furthermore, it also relates to a device for carrying out this method.

2. Discussion of Background

In more recent times, gas turbines with a high pressure ratio have been coming into use for stationary applications. They are advantageously equipped with intercooling during compression, in order in this way to achieve additional improvements in service performance and efficiency. This is achieved in a known way when the outlet temperature of the compressed combustion air resulting from the work of compression is reduced in the cooler. To be specific, excessively high compressor outlet temperatures cause problems in cooling the gas turbine and with respect to the polluting $NO_x$ emissions.

On the other hand, the effectiveness of the provided cooler depends on the temperature level to which the combustion air fed to it can be cooled. This temperature level is determined chiefly by the available coolant. Water or condensate, which forms a closed cooling circuit with the cooler, as a rule, is generally used as coolant. The provision of an artificial heat sink is frequently required in order to achieve a sufficient temperature drop in the combustion air. Such an artificial heat sink can be a cooling tower or a convective air cooler. Dt is known, however, that cooling water is available in sufficient quantity and quality only in the rarest instances.

Since, however, there is only a very sluggish heat transfer to the environment even in cooling towers which operate according to the evaporation principle or in air coolers in which convective heat transfer takes place, there is a need for correspondingly large structures. By and large, the space required for structures as large as this is not present at the installation site of a gas turbine. Moreover, convective coolers and compact, forced-ventilated evaporative coolers require electric energy in order to drive the fans thereby necessary.

In order to solve this basic problem, measures for a very compact transfer of heat to the environment have been found, in which a spontaneous evaporation of hot pressurized water takes place, for example in the flash method, instead of a sluggish evaporation, more specifically, instead of evaporation under partial pressure.

Thus, for example, it is possible to generate in the intercooler of a gas turbine or of a compressor hot water of, for example, 200° C. at a pressure which is above the respective saturation pressure, here 16 bar, for example.

The water heated in this way is depressurized to ambient pressure, a spontaneous evaporation of a partial quantity of water taking place. In this process, the hot pressurized water loses as much thermal energy as its heat content exceeds that of water at a temperature of 100° C. Of course, the quantity of evaporated water must be replaced by corresponding make-up water.

It is disadvantageous in such a cooling device that because of the ambient pressure of approximately 1 bar the water can be cooled only to approximately 100° C.

SUMMARY OF THE INVENTION

Accordingly, one object of the invention is to provide, starting from this prior art, a method of the type mentioned at the beginning and a device for carrying out this method, in order to achieve a further reaching temperature drop in the heated cooling water, specifically below 100° C. The depressurization accompanied by attendant evaporation therefore takes place according to the invention in at least 2 stages.

In accordance with a preferred embodiment of the method according to the invention, it can be provided that the heated water is depressurized in a first stage to a pressure which is higher than the ambient pressure. In this process, the evaporated water is used in each case for feeding into the drive nozzle of an ejector which generates in a vessel provided for this purpose a pressure which is less than the ambient pressure. The residual quantity of the heated water originating from the first stage is depressurized in the said vessel to the underpressure prevailing there.

It is possible in this way to achieve a distinctly sharper temperature drop, specifically below 100° C., since the underpressure prevailing in the evaporation vessel is distinctly below the ambient pressure.

In accordance with an advantageous embodiment of the invention, it is possible, furthermore, for the heating of the cooling water, which takes place before the depressurization, to take place in a separate heat exchanger which is heated externally, for example by the exhaust gas of the associated gas turbine.

In a expedient development of the invention, it is provided, furthermore, that the exhaust steam flowing from the ejector is condensed and used as makeup water, that is to say as replacement for the partial quantity of water evaporated.

A further advantageous embodiment of the invention provides that the exhaust steam flowing from the ejector is admixed with the exhaust gas of the gas turbine.

Finally, it is also possible in an expedient development of the invention to provide that the depressurization of the hot cooling water takes place to a pressure level such as permits the steam thereby produced to be fed into the gas turbine process.

A known device provided for carrying out this method has a turbocompressor with at least two compressor stages, a cooler to which water is applied as coolant, and at least one first evaporation vessel for a first depressurization of the water used for cooling.

In order to achieve the object on which the invention is based, the invention provides a second evaporation vessel which serves to depressurize the residual cooling water.

In an advantageous development of the device according to the invention, the depressurization evaporation takes place in the interior of a cooling tower, the residual water being further cooled by evaporation or convectively in a conventional way.

These and further advantageous embodiments of the invention are described below.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
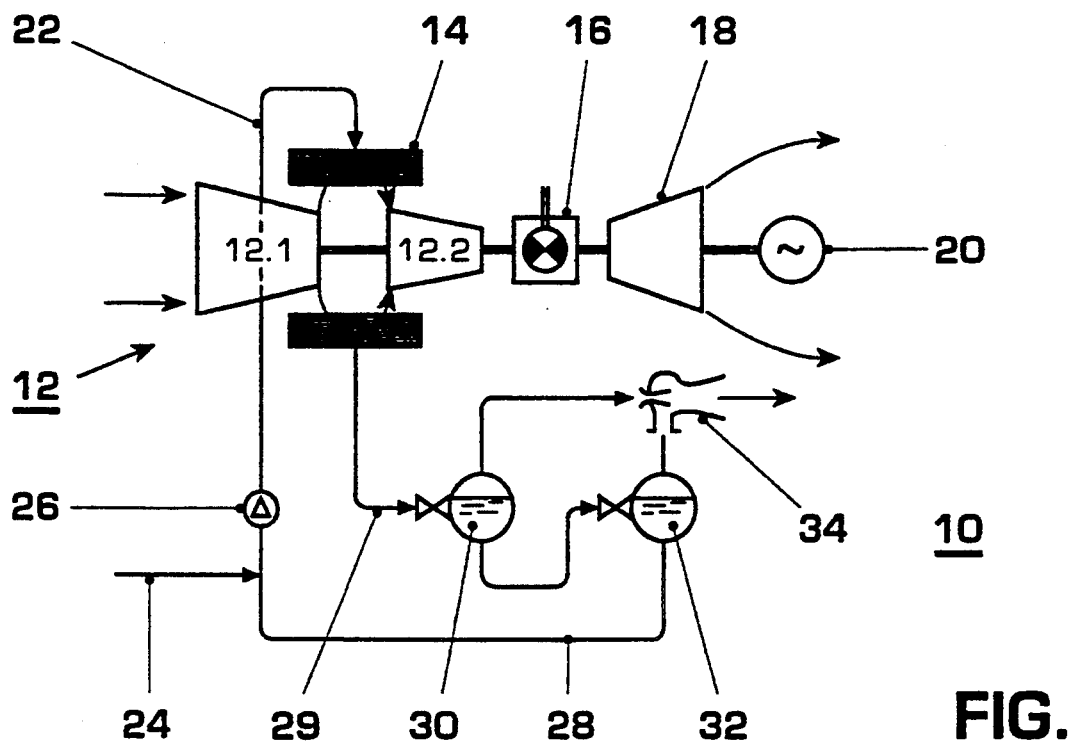
FIG. 1 shows the circuit diagram of a gas turbine group having a device according to the invention with two evaporation vessels.

Referring now to the drawings, wherein like reference numerals designate identical or corresponding parts throughout the several views, in FIG. 1 a circuit diagram of a gas turbine group 10 consisting of a two-stage compressor 12, a cooler 14, a combustion chamber 16, a gas turbine 18 and a generator 20 is represented. The cooler 14 for the two-stage compressor 12 is connected as an intercooler between the first compressor stage 12.1 and the second compressor stage 12.2 and has water applied to it as coolant via a line 22. The water lost by evaporation is continuously replaced via a line 24 from a source not defined in more detail. In this arrangement, a delivery pump 26 serves a purpose of continuously providing the cooling water.

The cooling water applied for the purpose of cooling the compressed combustion air in the cooler 14 by means of the waste heat thereof is fed via a line 29 to a first evaporation vessel 30, in which a pressure level prevails which exceeds the ambient pressure. Upon depressurization to this pressure, a portion of the hot cooling water evaporates. The residual quantity of the hot cooling water is fed to a second evaporation vessel 32, which is at a pressure level less than the ambient pressure, with the result that once again a portion thereof is evaporated and the remaining residual quantity of water is cooled to a temperature level of less than 100° C.

The steam generated in the first evaporation vessel 30 is fed to a drive nozzle of an ejector 34 which is connected to the second evaporation vessel 32 and, with the aid of the steam from the first evaporation vessel 30, evacuates the interior of the second evaporation vessel 32 to the underpressure level already mentioned. The steam flowing out of the ejector can, for example, be admixed with the exhaust gas flow of the gas turbine 18 in accordance with the arrow shown in FIG. 1.

Figure 2:
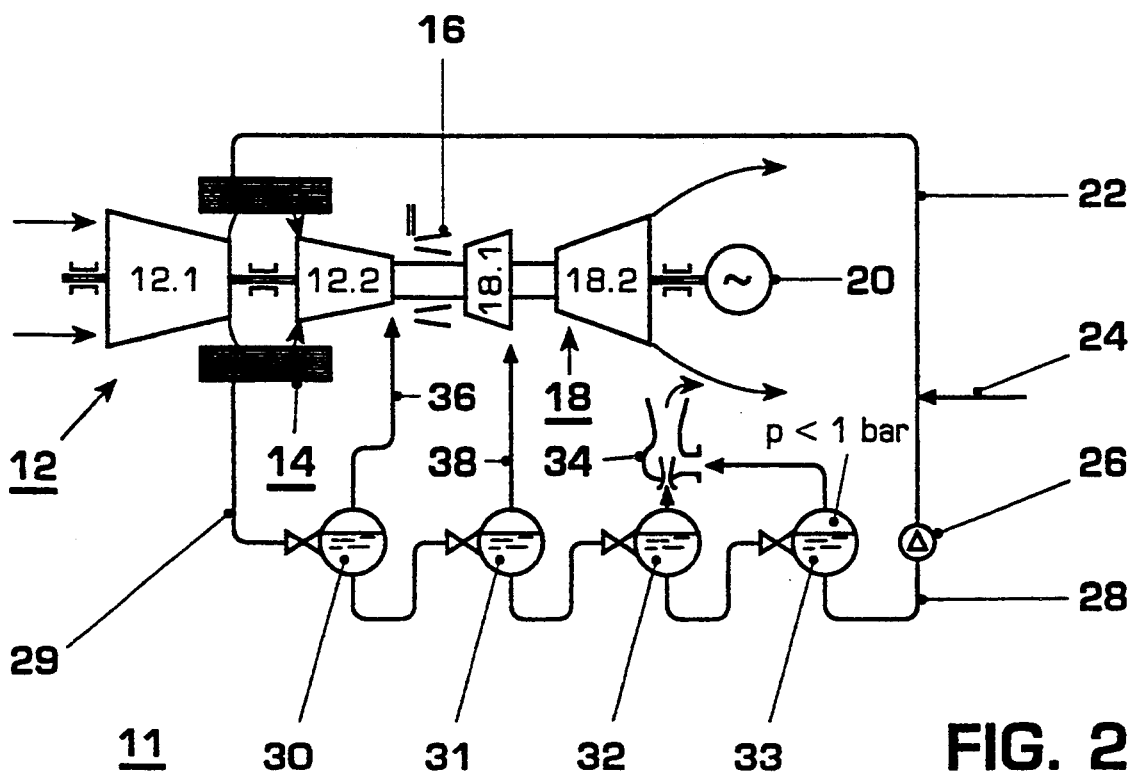
FIG. 2 shows the circuit diagram of a gas turbine group having a device according to the invention with four evaporation vessels.

FIG. 2 likewise shows a circuit diagram of a gas turbine group 11 which largely has components identical to those in FIG. 1. Consequently, identical components are provided with identical reference numerals. The explanations corresponding to those relating to FIG. 1 also apply for this purpose.

Differing in the gas turbine group 11 by comparison with the gas turbine group 10 shown in FIG. 1, is firstly the gas turbine 18 used, which is designed in two stages and has a first high-pressure stage 18.1 and a second low-pressure stage 18.2.

A further difference by comparison with the arrangement in accordance with FIG. 1 consists in that a total of four evaporation vessels 30, 31, 32, 33 are provided. As is also known from FIG. 1, the cooler provided for cooling the compressed combustion air has water applied to it as coolant via a line 22. The cooling water heated by the waste heat of the compressed combustion air passes via a line 29 to the first evaporation vessel 30, which has a pressure level such that only a small portion of the cooling water fed and at a higher pressure evaporates.

The steam produced by the depressurization to the pressure prevailing in the evaporation vessel 30 is fed to the combustion chamber 16 in common with the compressed displacement air via a line 36. The remaining residual quantity of hot cooling water is fed from the first evaporation vessel 30 to the second evaporation vessel 31, whose pressure is reduced by comparison with the first evaporation vessel 30, with the result that further spontaneous evaporation can take place, the pressure too, however, being substantially above the ambient pressure. The exhaust steam thereby produced is fed via a line 38 likewise for the purpose of increasing the mass flow, to the gas turbine 18, specifically by being fed into the low-pressure stage 18.2.

The residual quantity of hot cooling water remaining in the second evaporation vessel 31 is fed to the third evaporation vessel 32, which likewise has an internal pressure above ambient pressure. The steam produced in the depressurization taking place here is fed to an ejector 34 which, for its part, is connected to the fourth evaporation vessel 33 and evacuates the latter to a pressure level less than ambient pressure. The steam flowing off from the ejector 34 passes, as already known from the arrangement in accordance with FIG. 1, to the exhaust gas flow of the gas turbine 18.

The residual quantity of cooling water remaining in the fourth evaporation vessel 33 is fed via a line 28 to the delivery pump 26 which feeds the cooler 14 via the said line 22. Make-up water is fed from a reservoir (not shown in more detail) via the line 24.

Figure 3:
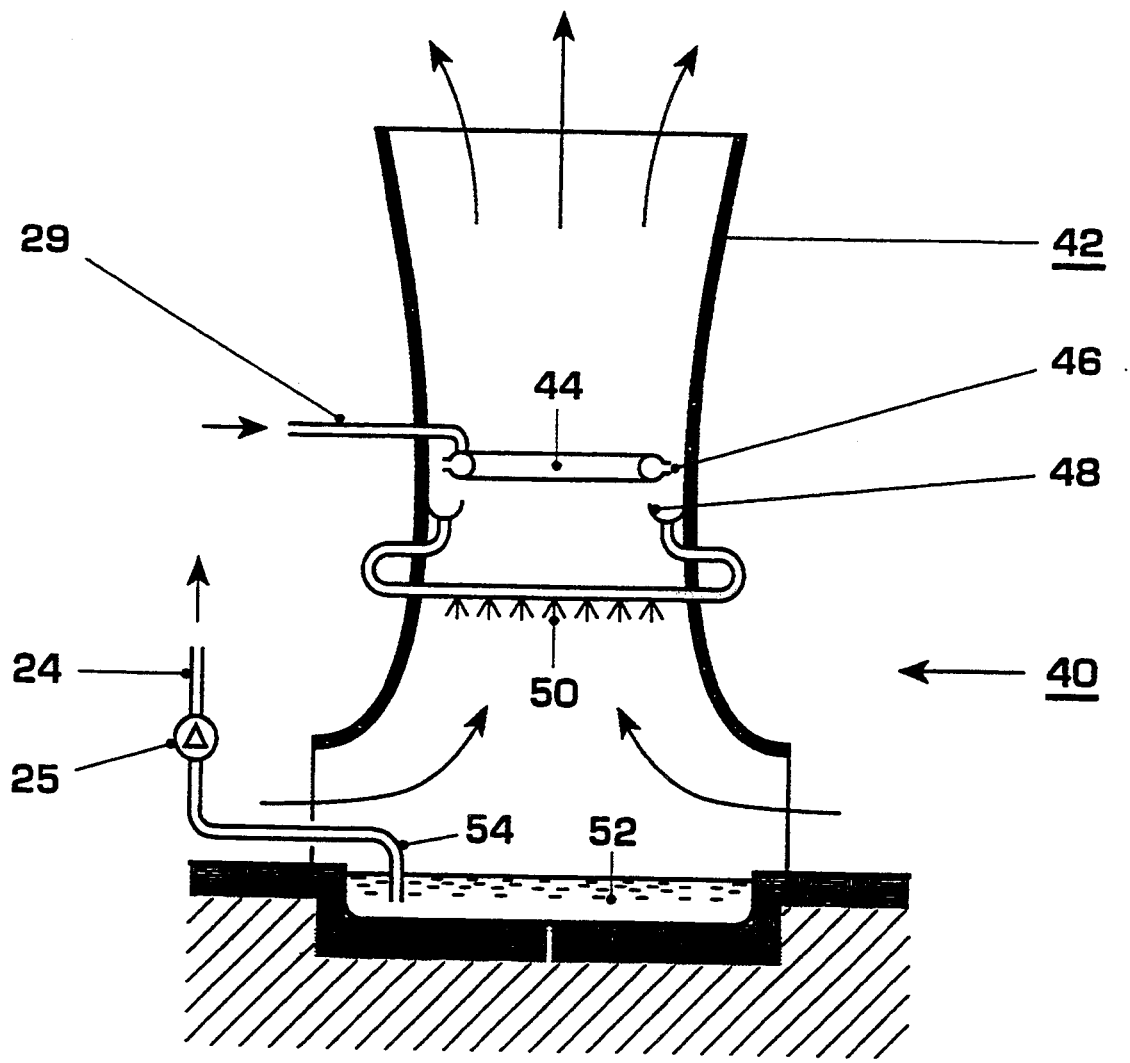
FIG. 3 shows an evaporative cooler such as can be used in the device according to the invention.

FIG. 3 represents an evaporative cooler 40 which has a cooling tower 42 in the conventional manner. Located in the interior of the cooling tower 42 is a ring line 44 which is connected to a line 29 via which hot cooling water from a cooler (not represented in more detail) of a gas turbine group (likewise not shown) is fed and is evaporated by nozzles 46 arranged on the ring line 44. While the stream produced flows off upwards via the cooling tower, the residual water passes into the channel 48 from where it is applied in the usual way to the sprinklers 50 of the evaporation arrangement. From that point on, the cooling tower operates in the usual way. A convective cooling bundle could also take the place of the sprinkler device 50. The sprinkled water is collected in a reservoir 52 and delivered via a line 54 to a pump 25 which supplies fresh cooling water to the cooler already mentioned (and not shown in more detail) via a line 24.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for operating a turbocompressor in a gas turbine group, the turbocompressor having at least two compressor stages and a cooler operating between compressor stages which has water applied to it as coolant, comprising the steps of:

directing cooling water to the cooler under pressure, wherein cooling water is heated to a temperature higher than 100° C. at a pressure above its saturation pressure:

directing the heated cooling water to a first vessel, the first vessel being at a pressure less than the pressure of the heated cooling water, the heated cooling water therein being depressurized to ambient pressure, and a portion of the heated cooling water thereby evaporated;

directing unevaporated residual cooling water from the first vessel to a second vessel at a pressure less than the pressure of the first vessel, the residual cooling water being depressurized to the pressure of the second vessel and a portion of the residual cooling water being therein evaporated; and adding make-up water to the residual cooling water from the second vessel before returning the cooling water to the cooler.

2. The method as claimed in claims 1, wherein a portion of the cooling water evaporated in the first vessel is provided to a drive nozzle of an ejector connected to the second vessel, the ejector evacuating the second vessel to a pressure which is lower than the ambient pressure, wherein evaporation of a portion of the residual cooling water in the second evaporation vessel cools the unevaporated cooling water to a temperature level of less of 100° C.

3. The method as claimed in claim 1, wherein the heating of the cooling water takes place before the depressurization at least partly by external heat.

4. The method as claimed in claim 2, further comprising condensing exhaust steam flowing from the ejector to water and adding the condensed water to the residual cooling water as make-up water.

5. The method as claimed in claim 2, further comprising admixing exhaust steam flowing from the ejector with an exhaust gas flow of a gas turbine.

6. The method as claimed in claim 2, wherein further comprising condensing exhaust steam flowing from the ejector to water and feeding the condensed water to a mass flow in a gas turbine process.

7. The method as claimed in claim 1, wherein the depressurization of the heated cooling water takes place at a pressure level so that the steam thereby produced is of a sufficient pressure to be fed into a mass flow in a gas turbine process.

8. The method as claimed in claim 1, further comprising the step of directing the cooling water to at least one preliminary vessel prior to the first vessel, the preliminary vessel being at a pressure below the pressure of the cooling water and above the pressure of the first vessel, wherein the cooling water depressurizes to the pressure in the preliminary vessel and a portion of the cooling water evaporates, and the unevaporated residual cooling water is directed to the first vessel.

9. The method as claimed in claim 8, further comprising directing the residual cooling water from the preliminary vessel to an intermediate vessel before the first vessel, the intermediate vessel being at a pressure below the pressure of the preliminary vessel and above the pressure of the first vessel, wherein the residual cooling water depressurizes to the pressure of the intermediate vessel and a portion of the residual cooling water evaporates, and the unevaporated residual water is directed to the first vessel.

* * * * *